Figure 2:
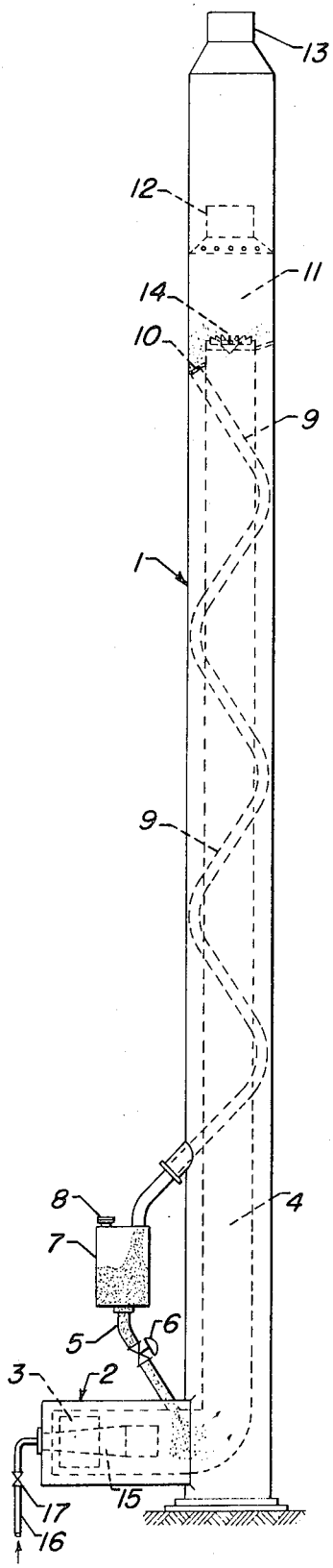

United States Patent

[11] 3,632,304

| [72] | Inventor | Leslie C. Hardison<br>Norwalk, Conn. |
|---|---|---|
| [21] | Appl. No. | 756,874 |
| [22] | Filed | Sept. 3, 1968 |
| [45] | Patented | Jan. 4, 1972 |
| [73] | Assignee | Universal Oil Products Company<br>Des Plaines, Ill. |

[54] CATALYTIC OXIDATION OF WASTE GAS STREAMS WITH FLUIDIZABLE SUBDIVIDED PARTICLES
7 Claims, 2 Drawing Figs.

[52] U.S. Cl......................................................... 23/2 S,
23/1 F, 23/288 B, 23/288 F, 23/288 S
[51] Int. Cl........................................................B01d 53/34,
B01j 9/20
[50] Field of Search............................................ 23/2.1, 1 F,
2.2, 288.3 F, 288.3 S, 288.9, 277 C, 3.1

[56] References Cited
UNITED STATES PATENTS
2,231,424  2/1941  Huppke...................... 23/1 X

| 2,358,497 | 9/1944 | Egloff............................ | 23/1 X |
| 2,526,689 | 10/1950 | Rollman........................ | 23/1 X |
| 3,231,326 | 1/1966 | Stine et al...................... | 23/1 |
| 3,243,265 | 3/1966 | Annesser....................... | 23/288 |
| 2,685,343 | 8/1954 | Permann........................ | 23/2 C |

*Primary Examiner*—Earl C. Thomas
*Attorneys*—James R. Hoatson, Jr. and Philip T. Liggett

ABSTRACT: Means for effecting the continuous catalytic oxidation of a waste gas stream by providing for the cocurrent flow of subdivided catalyst particles therewith upwardly in the lower part of a reactor-stack unit, separating the catalyst particles from the contacted gas stream at the upper end of the reactor section and returning them to a collecting and flow regulating means for reintroduction into a waste gas inlet zone to the unit. Burner means, mounted in combination with the inlet zone, is utilized to provide a hot gas stream to contact the recirculated catalyst particles and thus heat and regenerate them for use in the continuous catalytic oxidation system.

PATENTED JAN 4 1972      3,632,304

INVENTOR:
Leslie C. Hardison

BY: James R. Hoatson, Jr.
    Philip T. Liggett
    ATTORNEYS

CATALYTIC OXIDATION OF WASTE GAS STREAMS WITH FLUIDIZABLE SUBDIVIDED PARTICLES

The present invention relates to a method and means for effecting the continuous catalytic oxidation of a waste gas stream in a reactor-stack unit by the use of light weight subdivided catalyst particles which can be fluidized and carried with the gas stream through a reaction zone and then separated and returned for reuse at the inlet end of the reaction zone.

More specifically, the invention is directed to a continuous operation in a catalytic reactor-stack system, by arranging for the recirculation of the catalyst particles through the reactor section and, in addition, provide for heater means effecting the regeneration of the catalyst within the catalyst-gas inlet zone of the reactor section of the system.

It is recognized that various fixed bed systems using all metal catalysts are known or may be considered conventional for the catalytic contacting of a waste gas stream. Also, various fluidized and moving bed catalyst systems, where the catalyst is in a powdered or particulate form, have been used in connection with the chemical and petroleum fields and particularly for the conversion of hydrocarbons. However, it appears that very little utilization has been made of the subdivided oxidation catalysts in converting and purifying waste gas streams normally discharged through industrial tacks. Thus, it may be considered a principal object of the present invention to provide a continuous fluidized contact catalytic oxidation system for treating any gaseous waste gas stream which can be purified by oxidation in the presence of air.

A cocurrently moving catalyst bed can be operated to give residence time in a reactor section of a stack and "space velocity" (cubic feet per hour of gas per quantity of catalyst per hour) which is quite adequate and an equivalent to conventional fixed position metal catalyst beds or fixed beds of coated ceramic materials. Also, it is to be noted that additional amounts of catalyst can be added while the gas stream flows continuously such that the catalyst quantity or "loading" readily is varied during operation of the system by in turn varying the circulation rate of the catalyst. Still other advantages will be set forth hereinafter.

Briefly, the present invention provides a method for effecting the catalytic oxidation of a waste gas stream to provide removal of noxious components therein, which comprises, passing such stream at oxidizing conditions with admixed subdivided oxidation catalyst particles into the lower end portion of a combined reactor exhaust stack zone, effecting a cocurrent contact and upflow between the gas stream and said oxidation catalyst particles to an elevated portion of the reactor-stack zone, separating the contacted catalyst particles from the treated gas stream and returning them in a descending path to a collecting and flow regulating zone for reintroduction into the lower end portion of the reactor-stack zone and for reuse in effecting contact with the gas stream to be catalytically oxidized.

In another aspect, the present invention embodies a unitary type reactor-stack apparatus for effecting the catalytic oxidation of a waste gas stream, which comprises in combination, an elongated, vertically oriented stack section with a lower heat retaining reactor section, with such reactor section in turn having a lower gas inlet, a lower catalyst inlet, and an upper gas-particle outlet section with a a gas outlet and means for effecting the separation and collection of particles from the resulting contacted gas stream, pathway means extending from the latter downwardly along the outer wall of the reactor for passing catalyst particles downwardly or transfer to said catalyst inlet, and upper stack means connective with and extending above said reactor section for effecting the discharge of a treated waste gas stream.

Generally, a burner or other heat supply means will be provided at the lower end of the reactor section and adjacent the waste gas inlet, as well as directly upstream from the catalyst introduction point, whereby recirculated catalyst articles will descent into admixture with the entering waste gas stream and be in turn mixed with the hot gas from the burner, or other heat supply means, so that there is some removal of carbon deposition on the catalyst particles and a desirable heat level maintained in the unit to insure the catalytic conversion of the oxidizable components being introduced into the stack with the waste gases. Where a burner means is provided directly in combination with the inlet zone, a preferred form will embody the method of directing a fuel supply directly into a burner mixing zone and 100 percent of the air for oxidation purposes will be supplied as secondary air available from the waste gas stream itself. Thus, it becomes unnecessary to premix or admix air with the fuel to the burner and cause a reduction in the temperature and efficiency of the burner zone by the addition of primary air.

As will be pointed out more fully hereinafter with reference to the accompanying drawing, various means may be utilized to effect the continuous flow of catalyst particles n the system or the recycle of catalyst into the inlet zone. Generally, in order to provide suitable residence time for the catalyst and suitable space velocity within the reactor section of the reactor-stack unit, the reactor section will generally be of a vertically, elongated nature providing a substantial height to the reactor section itself. At the top of the reactor section there will be a separation of the cataylst particles from the contacted gas stream and a gravity flow of the catalyst particles to the lower end of the unit. Suitable directional vanes, centrifugal separators, or other separating means may be embodied in the unit at the top end of the reactor section and it is, of course, not intended to limit he invention to any one type of separator. The descending flow of the separated catalyst particles may be by any conventional conduit means or more preferably will be through a descending spiral conduit which will wrap around the periphery of the reactor section of the unit so as to maintain a high temperature for the contacted catalyst particles and permit their reentry into the inlet zone of the unit at a sustained high temperature. Where desired, the recycled catalyst particles may enter a hopper means and then be withdrawn therefrom at a regulated rate by suitable valving arrangements. For example, in order to provide an automatic regulated flow of the recycled catalyst there may be a valve means below the collection zone, and in combination with the inlet means into the bottom portion of the catalyst section, which will operate responsive to a differential pressure in the reaction zone. Pressure tap means carrying into the lower portion of the reactor will provide a differential pressure measurement which will in turn regulate the catalyst flow valve means for varying the circulation rate of the catalyst in the system.

The catalyst for the present fluidized type of waste gas contacting may comprise finely divided particles of any of the various conventional oxidizing catalysts, however, the catalyst will preferably be of a small spherical nature, ranging from the microsphere size up to the order of one-eighth inch diameter, or more. One preferred catalyst will comprise small quantities of platinum or of the platinum group of metals in order to have a high activity over a sustained period of operation. Actually, one or more desirable active components for an oxidation catalyst may be selected from the platinum group metals and/or Group VIII metals of the Periodic Table, as well as from the IB, V-B and VI-B groups of such Table. Thus, the catalyst to be employed for the production of a controlled atmosphere may comprise the following: platinum, palladium, iridium, ruthenium, rhodium, iron, cobalt, nickel, copper, vanadium, tungsten, molybdenum, silver, gold, etc., and various mixtures including platinum-iron, platinum-cobalt, platinum-nickel, palladium-iron, palladium-cobalt, palladium-nickel, platinum-palladium, palladium-copper-cobalt, copper-cobalt-nickel-platinum, platinum-palladium-cobalt, etc. Platinum, is of course, the preferred active metal component to provide a sustained high activity over a long period of time. Although the precise manner in which the catalytically active metallic component, such as platinum, is disposed within the carrier material is not known with absolute certainty, it is believed that the platinum, or other metallic component, enters into a complex combination with the carrier material and other components of the catalyst. Therefore, it is understood that the use of the term "platinum" or "metallic component," for example, connotes platinum or other metallic components existing within the carrier material in a combined form and/or in the elemental state. The carrier material may comprise naturally occuring substances such as clays, or earths, that may, or may not, be activated prior to use by one or more treatments including drying, calcining steaming, or treatments with various reagents, etc.

The catalytic composite of the present invention will preferably make use of an alumina-containing refractory inorganic oxide carrier material and, as employed herein, the term "alumina" is intended to include porous aluminum oxide in various states of hydration. In addition to alumina, other refractory inorganic oxides may be employed with the alumina. Other suitable inorganic oxides include silica, boria, thoria, titania, ziconia, hafnia, and mixtures of two or more of such oxides. The incorporation of any of the foregoing refractory inorganic oxides, in conjunction with the alumina, is generally dependent upon the desire to add thereto certain physical and/or chemical characteristics required by the particular application for which the catalytic composite is intended. Such other refractory inorganic oxides, or example, silica, will be present within the carrier material in an amount within the range of about 0.5 to about 25.0 percent by weight thereof, based upon the final weight of the carrier. Intermediate quantities are preferred and will lie within the range of about 1.0 percent to about 10.0 percent by weight. The carrier material may take the form of any desired shape however, such as spheres, pills, extrudates, granules, cakes, briquettes, rings, etc. The preferred form is the low-density sphere having an apparent bulk density in the range of about 0.2 to about 0.6. Spheres may be continuously manufactured by the well-known oil-drop method: this method is described in detail in U.S. Pat. No. 2,620,314 issued to James Hoekstra. In the interest of simplicity and clarity, the following discussion will be restricted to the use of alumina as the refractory inorganic oxide carrier material.

The catalytically active composite such as platinum may be added to the support material in any suitable convenient manner. With respect to platinum, suitable water soluble compounds may be utilized in the impregnating solution, including chloroplatinic acid, chloroplatinous acid, platinous chloride, platinic chloride, etc.

The quantity of the catalytically active metallic components is based upon the volume of the carrier material to be combined therewith, and is calculated on the basis of the elemental metal, notwithstanding that the metallic component may exist in some combined complex form, or in the elemental state. Thus, with respect to platinum group metals, the platinum will be present in an amount of from about 0.05 to about 2.0 Troy ounces per cubic foot of carrier material or within the range of from about 0.01 percent to about 1.0 percent of platinum, by weight of the composite. The preferred range of the concentration of the platinum component, dictated by the concentration of the platinum component, dictated by economic considerations, is from about 0.15 to about 0.60 Troy ounces per cubic foot of carrier material. The other metallic components, either in conjunction with, or instead of, the platinum component will be present in an amount of from about 0.01 to about 2.0 Troy ounces per cubic foot of carrier material employed.

In a preferred catalyst composite, there is also utilized a sulfur containing organic acid to treat the support material, or to commingle with the water soluble platinum compound, to effect a resulting surface active impregnation of the finished catalyst composite. The acid utilized is preferably a thio or mercapto carboxylic acid, as for example, thiomalic acid, thioglycolic acid, mercaptopropionic acid, etc.

Reference to the accompanying drawing and the following description hereof will serve to more clearly set forth the operation of the present improved continuous system, as well as set forth an apparatus embodiment for carrying out such system.

Figure 1:
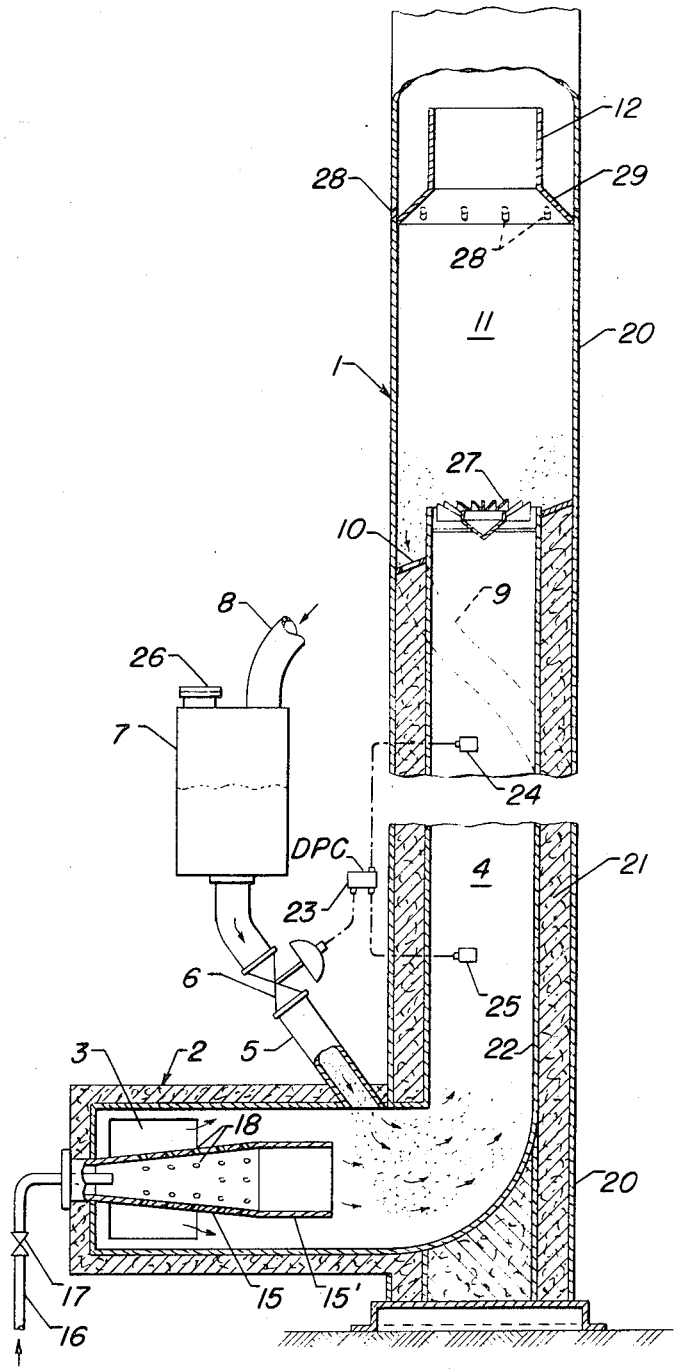

FIG. 1 of the drawing shown diagrammatically in an elevational view one means for carrying out the present improved continuous oxidizing system where catalyst will contact a waste gas stream in a vertically elongated reactor section of a reactor-stack arrangement.

FIG. 2 of the drawing shows in a sectional elevational view a more detailed arrangement for the waste gas inlet section and a means for recycling catalyst particles into such inlet section.

Referring now particularly to FIG. 1 of the drawing there is indicated a reactor-stack unit 1 having an inlet section 2 with means for receiving a waste gas stream through a side inlet 3. Thus, the waste gas stream may carry readily through section 2 and make a 90° turn to carry upwardly through an internal reactor section 4 while simultaneously carrying and contacting subdivided catalyst particles n an upwardly moving fluidized column of particles. The catalyst is introduced into admixture with a waste gas stream from feed line 5 at a rate regulated by value means 6.

As shown in the present embodiment, the catalyst particles are fed into the line 5 and through control valve 6 from a collection zone or storage hopper 7 which in turn receives the particles from the lower end of a descending helical pathway or conduit means 9. The latter in turn receives separated cataylst particles at an inlet 10 from the lower end portion of the separating zone 11 at the top of the reactor section 4. The oxidized and purified waste gas stream leaves the separation zone 11 by way of an internal outlet 12 and is then discharged to the atmosphere by way of stack outlet 13.

Various means, such as centrifugal separator means, may be used at the top end of the reactor section to assist in the removal of entrained catalyst particles at 11 so that they may be recycled to the lower end of the reactor section by way of conduit means 9. However, as indicated in the present simplified embodiment, the particle separation zone 11 is of an enlarged diameter whereby a reduction in gas velocity will assist in the settlement of catalyst particles in zone 11 and to the inlet 10 for recycle by way of pathway 9. Also, suitable baffles or spinner-type vanes 14 at the top of the reactor unit 4 may be used to effect the outward centrifugal flow of gas and entrained particles within section 11 so that the catalyst particles will impinge against the inner wall of zone 11 and descend to the lower portion thereof to pass by way of inlet opening 10 into conduit 9.

In combination with the lower inlet section 2, there is shown an internal burner nozzle 15 receiving fuel by way of line 16 and 17. Thus, a hot combustion gas stream is made available to contact the catalyst particles descending from discharge conduit 5 as well as to provide adequate reactor temperature for the waste gas stream entering inlet section 2 at the end of reactor section 4. Actually, the burner means will provide a twofold service in that it will assist in burning and removing carbon deposition from catalyst particles as well as maintain the desired operating temperature range within the reactor section 4. Generally, the catalytic oxidation will take place in the reactor section in the range of 700°F. upward to the order of 1,500°F., with a minimum being that required to initiate oxidation of the particular oxidizable component being carried into the reactor section with the waste gas stream. Generally, as the oxidation proceeds there will be an exothermic release of heat and an increased temperature level up through the lower portion of the reactor section 4. The temperature level and the residence time shall, in each instance, be adequate to assure the substantially complete conversion of the noxious component(s) to carbon dioxide and water whereby there is a minumum of noxious materials being issued from the upper end of stack means at outlet 13.

Referring now particularly to FIG. 2 of the drawing, the reactor-stack unit 1 is shown to have an outer shell 20 which carries on upwardly to provide the upper portion of the stack as well as an encasement for insulation means 21 circumscribing a lower reactor wall 22 circumscribing reactor zone 4. The inlet section 2, as shown in the enlarged view, provides the gas inlet 3 introducing the waste gas stream so as to surround an inner burner cone 15 and extension section 15' whereby there will be a uniform annular flow of gas around such burner means. It may also be noted that a plurality of gas inlet openings or holes 18 are provided in the cone 15 so as to in turn provide for the mixing of a portion of the waste gas stream from inlet 3 to effect a 100 percent secondary air type of burner operation.

Directly upstream from the burner section 15' and at the top of the inlet section 2 there is indicated the catalyst charge conduit 5 receiving a regulated flow of particles from control valve 6. The latter in turn receives catalyst particles from the storage zone 7. Preferably there is a regulated rate of catalyst introduction into the lower end of the reactor section 4 that is independent of the rate of flow of separated catalyst particles from the top end of reactor section 4. In this instance, control valve 6 is shown being operated by a differential pressure controller 23 which connects to pressure tap means 24 and 25 in the actor 4. Thus, in the continuously operating system, where it is desired to have a higher density of catalyst within the reactor 4, then the pressure control means 23 may be regulated to increase catalyst flow through valve 6 responsive to a minimum pressure differential sensed at 23. Conversely, where the pressure indication shows a heavy loading and density of particles in the reactor section, then there may be a cut back of valve 6 by differential pressure control means 23 and a reduction of catalyst particles means down through inlet 5.

The upper end of storage hopper means 7 shows a doorway or manhole means 26 suitable for adding additional catalyst into the system. Also shown is the lower end of a conduit means 8 which is available to connect with directed lower end of the helically shaped conduit means 9 carrying flow downwardly around the outside of reactor 4. In other words, the descending conduit means 9 may be embedded within the insulation 21 and adjacent reactor wall 22 so as to make a gradually descending and sloping path for catalyst particles within an insulated zone and in heat exchange relationship with the hot wall 22 for reactor section 4.

It will also be noted in connection with FIG. 2 f the drawing, that the upper end of reactor section 4 is provided with a plurality of sloping baffles or vane means 27 so that entrained catalyst particles will be centrifugally directed to the outer wall of separation section 11 to then flow into inlet opening 10 for a descending passage within conduit 9.

Still further, it will be noted that the upper portion of separation zone 11 has a smaller diameter outlet section 12 which discharges into the upper end of the housing 20 whereby cleaned gas stream may issue from the top end thereof. For purposes of removing any condensate or rain which may enter the upper end of stack housing 20, there may be suitable weep hole means 28 provided directly above the transition section 29.

It should, of course, be realized that the present drawing is diagrammatic and that various construction modifications are possible, as will as changes in placement of various inlets, valve means, etc., and that such variations may be obvious to one skilled in the art and within the scope of the present invention. For example, the orientation of the burner means of the waste gas inlet means at the lower end of the reactor section may be modified so as to other than through the 90° turn arrangement. Such change would not depart from the overall continuous fluidized system whereby there may be continuous circulation of particles up through an elongated reactor section which is integrally built within the lower end of a waste gas stack. Also, various temperature control arrangements may be made in effecting the controlled temperature introduction of catalyst particles at the lower end of the reactor section, however, preferably the arrangement does provide that there may be a regulated flow of catalyst particles in the system in order to in turn provide control for the catalyst circulation rate and space velocity within the reactor section itself.

EXAMPLE

By way of illustration, the present improved fluidized system may be operated in the following manner at the conditions set forth. The waste gas stream carrying combustible volatiles, such as toluene will be introduced into the lower end of the unit by way of inlet 3 and carry upwardly through the reactor 4 in the presence of synthetically prepared 1/32-inch (average diameter) particles of oxidation catalyst. The catalyst composition for the fluidized rising column contacting will, for example, comprise alumina impregnated with platinum. The alumina base particles will be of a spherical nature prepared to have an apparent bulk density of about 0.5. The platinum content as noted hereinbefore may vary but will be of about 0.1 percent platinum by weight of the alumina.

Within the inlet section 2, the gas and catalyst mixture will be assisted to a temperature increase by burner means 15 so as to have an inlet temperature in the lower end of the reactor of about 700° F. or at least sufficient to effect ignition and sustained catalytic oxidation of the burnable compounds. The amount of catalytic will be regulated to provide a density of about 0.22 pounds per cubic foot and differential pressure of 4-inch water gauge. With a reactor section of about 48-feet height there is thus provided about 10.6 pounds of catalyst for each square foot of cross-sectional area.

Gas flow is maintained at about 16 feet per second and catalyst residence time at about 3.0 seconds with catalyst velocity in the 10 to 11 foot per second range. With the oxidation reaction being exothermic, the gas and catalyst temperature leaving the top of the reactor section 4 will be of the order of 900° F. Thus catalyst returning to the lower end of the unit for reintroduction into inlet section 2 should be maintained as hot as possible to minimize burner fuel and heat introduction from burner means 15.

Although not intended to limit the operation in any way, means may be added to the system for withdrawing spent or contaminated catalyst as well as for introducing fresh catalyst so as to maintain a desired level of catalyst activity in the continuous operation.

I claim as my invention:

1. A method for the catalystic oxidation of a waste gas stream to be discharged to the atmosphere and containing oxidizable noxious components, which comprises burning adjacent the lower end portion of a combined reactor-exhaust stack zone, commingling said waste gas stream with the resultant combustion products and with subdivided oxidation catalyst particles in the lower portion of said zone, effecting an upflow cocurrent contact of the gases and catalyst particles to an elevated portion of the combined reactor-stack zone, separating the contacted catalyst particles from the gases in the upper portion of said zone and returning them in a descending path through collecting and flow regulating zone to the lower end portion of the reactor-stack zone for reuse in effecting contact with the gas stream to be catalytically oxidized.

2. The method of claim 1 further characterized in that differential pressure is measured at vertically spaced points within the reactor zone and catalyst recirculation rate is varied responsive to the differential pressure, whereby to in turn provide for variations in the amount of catalyst maintained within the reaction zone and the flow rate therethrough.

3. The method of claim 1 further characterized in that the oxygen for said fuel is supplied as 100 percent secondary air from said waste gas stream.

4. A unitary-type reactor-stack apparatus or effecting the catalytic oxidation of a waste gas stream, which comprises in combination, an elongated, vertically oriented stack section with a lower heat retaining reactor section, with such reactor section in turn having a lower gas inlet, fuel burner means downstream from said gas inlet and discharging into said reactor section, a lower catalyst inlet and an upper gas-particle separating section, with the latter having a gas outlet and means for effecting the separation and collection of particles from the resulting contacted gas stream, pathway means extending from the latter downwardly along the outer wall of the reactor for passing catalyst particles downwardly to said catalyst inlet, and upper stack means connective with and extending above said reactor section for effecting the discharge of a treated waste gas stream.

5. The unitary-type reactor-stack apparatus of claim 4 further characterized in that differential pressure sensing means is provided within said reactor section and such means connected with a differential pressure control means in turn connecting to and adjustably regulating catalyst flow control means at said lower catalyst inlet whereby the rate of catalyst particles feeding into admixture with the waste gas stream may be automatically regulated.

6. The reactor-stack apparatus of claim 4 still further characterized in that said fuel burner means is provided with means to receive and mix said stream therein whereby 100 percent of its air is supplied as secondary air from said waste gas stream.

7. The reactor-stack apparatus of claim 4 further characterized in that directional vanes are provided at the upper end portion of the reactor section whereby catalyst particles will be centrifugally thrown to the outer portion of said gas-particle separating outlet section for a subsequent descending flow.

* * * * *